(12) United States Patent
Paavilainen et al.

(10) Patent No.: US 8,889,792 B2
(45) Date of Patent: Nov. 18, 2014

(54) PROPYLENE/1-HEXENE COPOLYMER COMPOSITION WITH LOW SEALING TEMPERATURE

(75) Inventors: Juha Paavilainen, Helsinki (FI); Petar Doshev, Linz (AT); Kristin Reichelt, Neuhofen/Krems (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/642,085

(22) PCT Filed: Apr. 18, 2011

(86) PCT No.: PCT/EP2011/056181
§ 371 (c)(1),
(2), (4) Date: Dec. 5, 2012

(87) PCT Pub. No.: WO2011/131639
PCT Pub. Date: Oct. 27, 2011

(65) Prior Publication Data
US 2013/0203931 A1    Aug. 8, 2013

(30) Foreign Application Priority Data

Apr. 21, 2010 (EP) .................................... 10160631

(51) Int. Cl.
*C08F 8/00* (2006.01)
*C08L 23/10* (2006.01)
*C08J 5/18* (2006.01)
*C08L 23/14* (2006.01)

(52) U.S. Cl.
CPC .. *C08L 23/14* (2013.01); *C08J 5/18* (2013.01); *C08L 2205/02* (2013.01); *C08J 2323/14* (2013.01); *C08L 23/142* (2013.01)
USPC ............................ 525/191; 525/197; 525/240

(58) Field of Classification Search
USPC ............................................... 525/191, 197, 240
See application file for complete search history.

(56) References Cited

U.S. PATENT DOCUMENTS

| 6,573,343 B1 * | 6/2003 | Follestad ......................... 526/65 |
| 7,115,687 B2 * | 10/2006 | Vuorikari et al. ............... 526/64 |
| 7,476,710 B2 * | 1/2009 | Mehta et al. ................... 525/191 |

FOREIGN PATENT DOCUMENTS

| EP | 0556815 A1 | 8/1993 |
| EP | 0560326 A1 * | 9/1993 |
| EP | 1788023 A1 | 5/2007 |
| WO | WO-98/58976 A1 | 12/1998 |
| WO | 0144367 A1 | 6/2001 |
| WO | 0148034 A2 | 7/2001 |
| WO | WO-2009/144166 A1 | 12/2009 |

OTHER PUBLICATIONS

Japanese Office Action mailed Nov. 19, 2013.
Chinese Office Action mailed Nov. 14, 2013.

* cited by examiner

*Primary Examiner* — Nathan M Nutter
(74) *Attorney, Agent, or Firm* — Tarolli, Sundheim, Covell & Tummino LLP

(57) ABSTRACT

Propylene copolymer composition (P) comprising (a) a propylene copolymer (A) having a comonomer content of at least 1.0 wt.-%, the comomers are $C_5$ to $C_{12}$ a-olefins, and (b) a propylene copolymer (B) having a comonomer content of 4.0 to 20.0 wt.-%, the comomers are $C_5$ to $C_{12}$ a-olefins, wherein further (i) the comonomer content in the propylene copolymer (A) is lower compared to the comonomer content in the propylene copolymer (B), (ii) the propylene copolymer composition (P) has a comonomer content of 2.0 to 10.0 wt.-%, the comomers are $C_5$ to $C_{12}$ a-olefins, (iii) the weight ratio of the propylene copolymer (A) to the propylene copolymer (B) is the range of 30/70 to 80/20.

15 Claims, No Drawings

PROPYLENE/1-HEXENE COPOLYMER COMPOSITION WITH LOW SEALING TEMPERATURE

This application is a National Phase Filing of PCT/EP2011/056181, filed Apr. 18, 2011, which claims priority to European Patent Application No. 10160631.7, filed Apr. 21, 2010, the subject matter of which are incorporated herein by reference in their entirety.

The present invention is directed to a new propylene copolymer composition, its manufacture and use.

Polypropylenes are suitable for many applications. For instance polypropylene is applicable in areas where sealing properties play an important role, like in the food packing industry. Irrespectively from the polymer type, a polymer must fulfill at best all desired end properties and additionally must be easily processable, i.e. must withstand stress. However end properties and processing properties act often in a conflicting manner.

In many cases, the seal which is formed between the surfaces to be sealed is put under load while it is still warm. This means that the hot-tack properties of the polypropylene are crucial to ensure a strong seal is formed even before cooling. But not only the hot tack strength should be rather high but also the heat sealing initiation temperature should be rather low. By operating at lower temperature there is the benefit that the article to be sealed is not exposed to high temperature. There are also economic advantages since lower temperatures are of course cheaper to generate and maintain.

Apart from the sealing properties in food industry also low amounts of extractables are required.

Additionally the impact performance of the polymer must fulfill the demands of the food packing industry.

Accordingly the object of the present invention is to provide a polypropylene composition with high hot tack strength, low heat sealing initiation temperature (SIT) and good impact performance.

The finding of the present invention is to provide a propylene copolymer composition with rather high comonomer content, the comonomers are long chain α-olefins, and said propylene copolymer composition comprises two different fractions, said fractions differ in the comonomer content.

Accordingly the present invention is directed to a propylene copolymer composition (P) comprising
(a) a propylene copolymer (A) having a comonomer content of at least 1.0 wt.-%, the comonomers are $C_5$ to $C_{12}$ α-olefins, and
(b) a propylene copolymer (B) having a comonomer content of 4.0 to 20.0 wt.-%, the comonomers are $C_5$ to $C_{12}$ α-olefins,
wherein further
(i) the comonomer content in the propylene copolymer (A) is lower compared to the comonomer content in the propylene copolymer (B),
(ii) the propylene copolymer composition (P) has a comonomer content of at least 2.0 wt.-%, the comonomers are $C_5$ to $C_{12}$ α-olefins,
(iii) the weight ratio of the propylene copolymer (A) to the propylene copolymer (B) is in the range of 20/80 to 80/20, preferably in the range of 25/75 to 75/25, more preferably in the range of 30/70 to 70/30.

Preferably the propylene copolymer composition (P) comprises the propylene copolymer (A) and the propylene copolymer (B) as the only polymer components.

It has surprisingly been found that such a propylene copolymer composition (P) has a low heat sealing initiation temperature (SIT) and excellent impact properties (see example section)

In the following the invention is defined in more detail.

The propylene copolymer composition (P) according to this invention is featured by a rather high comonomer content. The rather high comonomer content is achieved due to the fact that the inventive propylene copolymer composition (P) comprises two fractions of propylene copolymer as defined herein. A "comonomer" according to this invention is a polymerizable unit different to propylene. Accordingly the propylene copolymer composition (P) according to this invention shall have a comonomer content of at least 2.0 wt.-%, more preferably of at least 2.4 wt.-%, more preferably of at least 3.0 wt.-%, still more preferably of at least 3.5 wt.-%, like at least 3.8 wt.-%. Thus it is preferred that the propylene copolymer composition (P) according to this invention has a comonomer content in the range of 2.0 to 10.0 wt.-%, more preferably in the range of 2.4 to 8.0 wt.-%, still more preferably in the range of 3.0 to 8.0 wt.-%, still more preferably in the range of 3.5 to 8.0 wt.-%, like in the range of 3.5 to 6.5 wt.-%.

The comonomers of the propylene copolymer composition (P) are $C_5$ to $C_{12}$ α-olefins, e.g. 1-hexene and/or 1-octene. The propylene copolymer composition (P) of the present invention may contain more than one type of comonomer. Thus the propylene copolymer composition (P) of the present invention may contain one, two or three different comonomers, the comonomers are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, and $C_{12}$ α-olefin. However it is preferred that the propylene copolymer composition (P) contains only one type of comonomer. Preferably the propylene copolymer composition (P) comprises—apart from propylene—only 1-hexene and/or 1-octene. In an especially preferred embodiment the comonomer of the propylene copolymer composition (P) is only 1-hexene.

The propylene copolymer composition (P) as well as the propylene copolymer (A) and the propylene copolymer (B) according to this invention are preferably random propylene copolymers. The term "random copolymer" has to be preferably understood according to IUPAC (Pure Appl. Chem., Vol. No. 68, 8, pp. 1591 to 1595, 1996). Preferably the molar concentration of comonomer dyads, like 1-hexene dyads, obeys the relationship $$[HH] < [H]^2$$

wherein
[HH] is the molar fraction of adjacent comonomer units, like of adjacent 1-hexene units, and
[H] is the molar fraction of total comonomer units, like of total 1-hexene units, in the polymer.

Preferably the propylene copolymer composition (P) as well as the propylene copolymer (A) and the propylene copolymer (B) as defined in detail below are isotactic. Accordingly it is appreciated that the propylene copolymer composition (P), the propylene copolymer (A) and the propylene copolymer (B) have a rather high isotactic triad concentration, i.e. higher than 90%, more preferably higher than 92%, still more preferably higher than 93% and yet more preferably higher than 95%, like higher than 97%.

The molecular weight distribution (MWD) is the relation between the numbers of molecules in a polymer and the individual chain length. The molecular weight distribution (MWD) is expressed as the ratio of weight average molecular weight ($M_w$) and number average molecular weight ($M_n$).

The number average molecular weight ($M_n$) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight ($M_w$) is the first moment of a plot of the weight of polymer in each molecular weight range against molecular weight.

The number average molecular weight ($M_n$) and the weight average molecular weight ($M_w$) as well as the molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

Accordingly it is preferred that the inventive propylene copolymer composition (P) has a weight average molecular weight ($M_w$) from 100 to 700 kg/mol, more preferably from 150 to 400 kg/mol.

The number average molecular weight ($M_n$) of the polypropylene is preferably in the range of 25 to 200 kg/mol, more preferably from 30 to 150 kg/mol.

Further it is appreciated that the molecular weight distribution (MWD) measured according to ISO 16014 is not more than 4.0, more preferably not more than 3.5, like not more than 3.0. Thus the molecular weight distribution (MWD) of the propylene copolymer composition (P) is preferably between 2.0 to 4.0, still more preferably in the range of 2.0 to 3.5, like 2.0 to 3.0.

Furthermore, it is preferred that the propylene copolymer composition (P) of the present invention has a melt flow rate (MFR) given in a specific range. The melt flow rate measured under a load of 2.16 kg at 230° C. (ISO 1133) is denoted as $MFR_2$ (230° C.). Accordingly, it is preferred that in the present invention the propylene copolymer composition (P) has a the melt flow rate $MFR_2$ (230° C.) measured according to ISO 1133 in the range of 2.0 to 50.0 g/10 min, more preferably in the range of 3.0 to 25.0 g/10 min, still more preferably in the range of 4.0 to 20.0 g/10 min.

As mentioned above, the inventive propylene copolymer composition (P) shall be especially suitable for the packing industry. Accordingly good sealing properties are desired, like rather low heat sealing initiation temperature (SIT) combined with good mechanical properties, like good impact behavior.

Accordingly it is preferred that the propylene copolymer composition (P) has a heat sealing initiation temperature (SIT) of not more than 120° C., more preferably not more than 110° C., still more preferably in the range of 90 to 120° C., yet more preferably in the range of 93 to 118° C.

But not only the heat sealing initiation temperature (SIT) shall be rather low but also the melting temperature ($T_m$) shall be rather high. Accordingly the difference between the melting temperature ($T_m$) and the heat sealing initiation temperature (SIT) shall be rather high. Thus it is preferred that the propylene copolymer composition (P) fulfills the equation (I), more preferably the equation (Ia), $$Tm - SIT \geq 22° C. \tag{I}$$

$$Tm - SIT \geq 24° C. \tag{Ia}$$

wherein

Tm is the melting temperature given in centigrade [° C.] of the propylene copolymer composition (P), SIT is the heat sealing initiation temperature (SIT) given in centigrade [° C.] of the propylene copolymer composition (P).

The melting temperature ($T_m$) measured according to ISO 11357-3 of the propylene copolymer composition (P) is preferably at least 125.0° C., more preferably of at least 128° C. Thus it is in particular appreciated that the melting temperature ($T_m$) measured according to ISO 11357-3 of the propylene copolymer composition (P) is in the range of 125 to 145° C., more preferably in the range of 128 to 140° C.

Additionally it is appreciated that the propylene copolymer composition (P) of the instant invention has crystallization temperature ($T_c$) measured according to ISO 11357-3 of at least 88° C., more preferably of at least 90° C. Accordingly the polypropylene has preferably a crystallization temperature ($T_c$) measured according to ISO 11357-3 in the range of 88 to 110° C., more preferably in the range of 90 to 105° C.

Additionally the propylene copolymer can be defined by the xylene cold soluble (XCS) content measured according to ISO 6427. Accordingly the propylene copolymer composition (P) is preferably featured by a xylene cold soluble (XCS) content of below 20.0 wt.-%, more preferably of below 15.0 wt.-%, yet more preferably equal or below 10.0 wt.-%, still more preferably below 5.0 wt.-%, like below 4.0 wt.-%. Thus it is in particular appreciated that the propylene copolymer composition (P) of the instant invention has a xylene cold soluble (XCS) content in the range of 0.3 to 20.0 wt.-%, more preferably in the range of 0.5 to 10.0 wt.-%, yet more preferably in the range of 0.5 to 5.0 wt.-%.

Similar to xylene cold solubles (XCS) the hexane hot soluble (HHS) indicate that part of a polymer which has a low isotacticity and crystallinity and which is soluble in hexane at 50° C.

Accordingly it is preferred that the inventive propylene copolymer composition (P) has hexane hot solubles (HHS) measured according to FDA 177.1520 of not more than 2.5 wt.-%, more preferably not more than 2.0 wt.-%, like not more than 1.5 wt.-%.

The propylene copolymer composition (P) of the present invention is further defined by its polymer fractions present. Accordingly the propylene copolymer composition (P) of the present invention comprises at least, preferably consists of, two fractions, namely the propylene copolymer (A) and the propylene copolymer (B).

Further propylene copolymer (A) is preferably the comonomer lean fraction whereas the propylene copolymer (B) is the comonomer rich fraction. Accordingly the comonomer content in the propylene copolymer (A) is lower compared to the comonomer content of the propylene copolymer (B). Thus it is appreciated that the propylene copolymer composition (P) fulfils the correlation com (P)/com (A) being in the range of more than 1.0 to 10.0, more preferably being in the range of 1.2 to 6.0, still more preferably in the range of 1.5 to 5.0, wherein com (A) is the comonomer content of the propylene copolymer (A) given in weight percent [wt.-%], com (P) is the comonomer content of the propylene copolymer composition (P) given in weight percent [wt.-%].

Thus it is appreciated that the propylene copolymer (A) has a comonomer content of at least 1.0 wt.-%, more preferably the comonomer content is in the range of more than 1.0 to 4.0 wt.-%, yet more preferably in the range of 1.2 to 3.5 wt.-%.

The comonomers of the propylene copolymer (A) are $C_5$ to $C_{12}$ α-olefins, more preferably the comonomers of the propylene copolymer (A) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin, still more preferably the comonomers of the propylene copolymer (A) are 1-hexene and/or 1-octene. The propylene copolymer (A) may contain more than one type of comonomer. Thus the propylene copolymer (A) of the present invention may contain one, two or three different comonomers. However it is preferred that the propylene copolymer (A) contains only one type of comonomer. Preferably the propylene copolymer (A) comprises—apart from propylene—only 1-hexene and/or 1-octene. In an especially preferred embodiment the comonomer of the propylene copolymer (A) is only 1-hexene Thus the propylene copolymer (A) is in one preferred embodiment a propylene copolymer of propylene and 1-hexene only, wherein the 1-hexene content is in the range of more than 1.0 to 4.0 wt.-%, yet more preferably in the range of 1.2 to 3.5 wt.-%.

As stated above, the propylene copolymer (B) has a higher comonomer content than the propylene copolymer (A). Accordingly the propylene copolymer (B) has a comonomer content of 2.5 to 20.0 wt.-%, preferably more than 3.0 to 18.0 wt.-%, more preferably of 4.0 to 15.0 wt.-%.

The comonomers of the propylene copolymer (B) are $C_5$ to $C_{12}$ α-olefins, more preferably the comonomers of the propylene copolymer (B) are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin, and $C_{12}$ α-olefin, still more preferably the comonomers of the propylene copolymer (B) are 1-hexene and/or 1-octene. The propylene copolymer (B) may contain more than one type of comonomer. Thus the propylene copolymer (B) of the present invention may contain one, two or three different comonomers. However it is preferred that the propylene copolymer (B) contains only one type of comonomer. Preferably the propylene copolymer (B) comprises—apart from propylene—only 1-hexene and/or 1-octene. In an especially preferred embodiment the comonomer of the propylene copolymer (B) is only 1-hexene.

Thus the propylene copolymer (B) is in a preferred embodiment a propylene copolymer of propylene and 1-hexene only, wherein the 1-hexene content is in the range of 2.5 to 20.0 wt.-%, preferably more than 3.0 to 18.0 wt.-%, more preferably of 4.0 to 15.0 wt.-%. It is in particular preferred that the comonomers of the propylene copolymer (A) and of the propylene copolymer (B) are the same. Accordingly in one preferred embodiment the propylene copolymer composition (P) of the instant invention comprises, preferably comprises only, a propylene copolymer (A) and a propylene copolymer (B), in both polymers the comonomer is only 1-hexene.

One important aspect of the present invention is that the propylene copolymer (A) and the propylene copolymer composition (P) differ in the comonomer content. Additionally the propylene copolymer (A) and the propylene copolymer composition (P) may also differ in the melt flow rate. Accordingly the ratio MFR (A)/MFR(P) is preferably in the range of 0.25 to 10.0, more preferably in the range of 0.5 to 5.0, yet more preferably in the range of 0.7 to 2.5, wherein MFR (A) is the melt flow rate $MFR_2$ (230° C.) [g/10 min] measured according to ISO 1133 of the propylene copolymer (A), MFR(P) is the melt flow rate $MFR_2$ (230° C.) [g/10 min] measured according to ISO 1133 of the propylene copolymer composition (P).

Further it is appreciated that the propylene copolymer (A) has a melt flow rate $MFR_2$ (230° C.) measured according to ISO 1133 of at least 0.5 g/10 min, more preferably of at least 2.0 g/10 min, still more preferably in the range of 0.5 to 70 g/10 min, yet more preferably in the range of 2.0 to 50.0 g/10 min, like 5.5 to 20.0 g/10 min.

As a high melt flow rate indicates a low molecular weight, it is appreciated that the propylene copolymer (A) has a weight average molecular weight ($M_w$) of below 450 kg/mol, still more preferably of below 400 kg/mol, yet more preferably in the range of 150 to below 450 kg/mol, like in the range of 180 to 400 kg/mol.

Further the propylene copolymer (A) has preferably a xylene cold soluble (XCS) content of below 2.0 wt.-%, more preferably of below 1.5 wt.-%, still more preferably in the range of 0.3 to 2.0 wt.-%, yet more preferably in the range of 0.5 to 1.5 wt.-%. It is in particular preferred that the propylene copolymer (A) has a lower xylene cold soluble (XCS) content than the propylene copolymer (B).

The propylene copolymer composition (P) may contain additives known in the art, like antioxidants, nucleating agents, slip agents and antistatic agents. The polymer fraction, preferably the sum of the propylene copolymer (A) and the propylene copolymer (B) fractions, is at least 90 wt.-%, more preferably at least 95 wt.-%, still more preferably at least 98 wt.-%, like at least 99 wt.-%.

The propylene copolymer composition (P) is in particular obtainable, preferably obtained, by a process as defined in detail below.

Further the invention is directed to the use of the instant propylene copolymer composition (P) as a film, like a cast film, an extrusion blown film or a biaxially oriented polypropylene (BOPP) film. The propylene copolymer composition (P) of the present invention can be also used as a coating of an extrusion coated substrate.

Accordingly the invention is also directed to a film layer, preferably to a sealing layer of a cast film, of an extrusion blown film or of a biaxially oriented polypropylene (BOPP) film, said film layer (sealing layer) comprises at least 70 wt.-%, more preferably at least 80 wt.-%, like at least 90 wt.-%, of the propylene copolymer composition (P) according to the instant invention. In an especially preferred embodiment the film layer (sealing layer) consists of the propylene copolymer composition (P) as defined herein.

Further the present invention is directed to an extrusion coated substrate comprising a coating, said coating comprises at least 70 wt.-%, more preferably at least 90 wt.-%, like at least 95 wt.-%, of the propylene copolymer composition (P) according to the instant invention. In an especially preferred embodiment the coating of the extrusion coated substrate consists of the propylene copolymer composition (P) as defined herein. The substrate can be for instance paper, paperboard, fabrics and metal foils.

Additionally the present invention is directed to the preparation of the propylene copolymer composition (P) of the instant invention. Accordingly the process for the preparation of a propylene copolymer composition (P) as defined above is a sequential polymerization process comprising at least two reactors connected in series, wherein said process comprises the steps of (A) polymerizing in a first reactor (R-1) being a slurry reactor (SR), preferably a loop reactor (LR), propylene and at least one $C_5$ to $C_{12}$ α-olefin, preferably 1-hexene, obtaining a propylene copolymer (A) as defined in the instant invention, preferably as defined any one of the claims 1, 8 to 10, (B) transferring said propylene copolymer (A) and unreacted comonomers of the first reactor in a second reactor (R-2) being a gas phase reactor (GPR-1), (C) feeding to said second reactor (R-2) propylene and at least one $C_5$ to $C_{12}$ α-olefin, (D) polymerizing in said second reactor (R-2) and in the presence of said first propylene copolymer (A) propylene and at least one $C_5$ to $C_{12}$ α-olefin obtaining a propylene copolymer (B) as defined in the instant invention, preferably as defined in any one of the claims 1, 8, or 9, said propylene copolymer (A) and said propylene copolymer (B) form the propylene copolymer composition (P) as defined in the instant invention, preferably as defined in any one of the claims 1 to 7,
wherein further
in the first reactor (R-1) and second reactor (R-2) the polymerization takes place in the presence of a solid catalyst system (SCS), said solid catalyst system (SCS) comprises
(i) a transition metal compound of formula (I)

$$R_n(Cp')_2MX_2 \qquad (1)$$

wherein
"M" is zirconium (Zr) or hafnium (Hf),
each "X" is independently a monovalent anionic σ-ligand,
each "Cp'" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2, preferably 1, and
(ii) optionally a cocatalyst (Co) comprising an element (E) of group 13 of the periodic table (IUPAC), preferably a cocatalyst (Co) comprising a compound of Al.

Concerning the definition of the propylene copolymer composition (P), the propylene copolymer (A) and the propylene copolymer (B) it is referred to the definitions given above.

Due to the use of the catalyst system (SCS) in a sequential polymerization process the manufacture of the above defined propylene copolymer composition (P) is possible. In particular due to the preparation of a propylene copolymer, i.e. the propylene copolymer (A), in the first reactor (R-1) and the conveyance of said propylene copolymer and especially the conveyance of unreacted comonomers into the second reactor (R-2) it is possible to produce a propylene copolymer composition (P) with high comnomer content in a sequential polymerization process. Normally the preparation of a propylene copolymer with high comonomer content in a sequential polymerization process leads to fouling or in severe cases to the blocking of the transfer lines as normally unreacted comonomers condensate at the transfer lines. However with the new method the conversion of the comonomers is increased and therewith a better incorporation into the polymer chain leading to higher comonomer content and reduced stickiness problems.

The term "sequential polymerization process" indicates that the propylene copolymer composition (P) is produced in at least two reactors connected in series. More precisely the "term sequential polymerization process" indicates in the present application that the polymer of the first reactor (R-1) is directly conveyed with unreacted comonomers to the second reactor (R-2). Accordingly decisive aspect of the present process is the preparation of the propylene copolymer composition (P) in two different reactors, wherein the reaction material of the first reactor (R-1) is directly conveyed to the second reactor (R-2). Thus the present process comprises at least a first reactor (R-1) and a second reactor (R-2). In one specific embodiment the instant process consists of two the polymerization reactors (R-1) and (R-2). The term "polymerization reactor" shall indicate that the main polymerization takes place. Thus in case the process consists of two polymerization reactors, this definition does not exclude the option that the overall process comprises for instance a pre-polymerization step in a pre-polymerization reactor. The term "consists of" is only a closing formulation in view of the main polymerization reactors.

The first reactor (R-1) is preferably a slurry reactor (SR) and can be can be any continuous or simple stirred batch tank reactor or loop reactor operating in bulk or slurry. Bulk means a polymerization in a reaction medium that comprises of at least 60% (wt/wt), preferably 100% monomer. According to the present invention the slurry reactor (SR) is preferably a (bulk) loop reactor (LR).

The second reactor (R-2) and any subsequent reactor are preferably gas phase reactors (GPR). Such gas phase reactors (GPR) can be any mechanically mixed or fluid bed reactors. Preferably the gas phase reactor s (GPR) comprise a mechanically agitated fluid bed reactor with gas velocities of at least 0.2 m/sec. Thus it is appreciated that the gas phase reactor is a fluidized bed type reactor preferably with a mechanical stirrer.

The condition (temperature, pressure, reaction time, monomer feed) in each reactor is dependent on the desired product which is in the knowledge of a person skilled in the art. As already indicated above, the first reactor (R-1) is preferably a slurry reactor (SR), like a loop reactor (LR), whereas the second reactor (R-2) is preferably a gas phase reactor (GPR-1). The subsequent reactors—if present—are also preferably gas phase reactors (GPR).

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379, and WO 98/58976. The contents of these documents are included herein by reference.

Preferably, in the instant process for producing propylene copolymer composition (P) as defined above the conditions for the first reactor (R-1), i.e. the slurry reactor (SR), like a loop reactor (LR), of step (A) may be as follows:
 the temperature is within the range of 40° C. to 110° C., preferably between 60° C. and 100° C., 70 to 90° C.,
 the pressure is within the range of 20 bar to 80 bar, preferably between 40 bar to 70 bar,
 hydrogen can be added for controlling the molar mass in a manner known per se.

Subsequently, the reaction mixture from step (A) is transferred to the second reactor (R-2), i.e. gas phase reactor (GPR-1), i.e. to step (D), whereby the conditions in step (D) are preferably as follows:
 the temperature is within the range of 50° C. to 130° C., preferably between 60° C. and 100° C.,
 the pressure is within the range of 5 bar to 50 bar, preferably between 15 bar to bar,
 hydrogen can be added for controlling the molar mass in a manner known per se.

The residence time can vary in both reactor zones.

In one embodiment of the process for producing propylene copolymer composition (P) the residence time in bulk reactor, e.g. loop is in the range 0.2 to 4 hours, e.g. 0.3 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R-1), i.e. in the slurry reactor (SR), like in the loop reactor (LR), and/or as a condensed mode in the gas phase reactor (GPR-1).

The conditions in the other gas phase reactors (GPR), if present, are similar to the second reactor (R-2).

The present process may also encompass a pre-polymerization prior to the polymerization in the first reactor (R-1). The pre-polymerization can be conducted in the first reactor (R-1), however it is preferred that the pre-polymerization takes place in a separate reactor, so called pre-polymerization reactor.

In one specific embodiment the solid catalyst system (SCS) has a porosity measured according ASTM 4641 of less than 1.40 ml/g and/or a surface area measured according to ASTM D 3663 of lower than 25 m²/g.

Preferably the solid catalyst system (SCS) has a surface area of lower than 15 m²/g, yet still lower than 10 m²/g and most preferred lower than 5 m²/g, which is the lowest measurement limit. The surface area according to this invention is measured according to ASTM D 3663 ($N_2$).

Alternatively or additionally it is appreciated that the solid catalyst system (SCS) has a porosity of less than 1.30 ml/g and more preferably less than 1.00 ml/g. The porosity has been measured according to ASTM 4641 ($N_2$). In another preferred embodiment the porosity is not detectable when determined with the method applied according to ASTM 4641 ($N_2$).

Furthermore the solid catalyst system (SCS) typically has a mean particle size of not more than 500 μm, i.e. preferably in the range of 2 to 500 μm, more preferably 5 to 200 μm. It is in particular preferred that the mean particle size is below 80 μm, still more preferably below 70 μm. A preferred range for the mean particle size is 5 to 70 μm, or even 10 to 60 μm.

As stated above the transition metal (M) is zirconium (Zr) or hafnium (Hf), preferably zirconium (Zr).

The term "σ-ligand" is understood in the whole description in a known manner, i.e. a group bound to the metal via a sigma bond. Thus the anionic ligands "X" can independently be halogen or be selected from the group consisting of R', OR', SiR'$_3$, OSiR'$_3$, OSO$_2$CF$_3$, OCOR', SR', NR'$_2$ or PR'$_2$ group wherein R' is independently hydrogen, a linear or branched, cyclic or acyclic, $C_1$ to $C_{20}$ alkyl, $C_2$ to $C_{20}$ alkenyl, $C_2$ to $C_{20}$ alkynyl, $C_3$ to $C_{12}$ cycloalkyl, $C_6$ to $C_{20}$ aryl, $C_7$ to $C_{20}$ arylalkyl, $C_7$ to $C_{20}$ alkylaryl, $C_8$ to $C_{20}$ arylalkenyl, in which the R' group can optionally contain one or more heteroatoms belonging to groups 14 to 16. In a preferred embodiments the anionic ligands "X" are identical and either halogen, like Cl, or methyl or benzyl.

A preferred monovalent anionic ligand is halogen, in particular chlorine (Cl).

The substituted cyclopentadienyl-type ligand(s) may have one or more substituent(s) being selected from the group consisting of halogen, hydrocarbyl (e.g. $C_1$ to $C_{20}$ alkyl, $C_2$ to $C_{20}$ alkenyl, $C_2$ to $C_{20}$ alkynyl, $C_3$ to $C_{20}$ cycloalkyl, like $C_1$ to $C_{20}$ alkyl substituted $C_5$ to $C_{20}$ cycloalkyl, $C_6$ to $C_{20}$ aryl, $C_5$ to $C_{20}$ cycloalkyl substituted $C_1$ to $C_{20}$ alkyl wherein the cycloalkyl residue is substituted by $C_1$ to $C_{20}$ alkyl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkynyl, $C_3$ to $C_{12}$ cycloalkyl, or $C_6$ to $C_{20}$ aryl) or e.g. in case of —NR"$_2$, the two substituents R" can form a ring, e.g. five- or six-membered ring, together with the nitrogen atom wherein they are attached to.

Further "R" of formula (I) is preferably a bridge of 1 to 4 atoms, such atoms being independently carbon (C), silicon (Si), germanium (Ge) or oxygen (O) atom(s), whereby each of the bridge atoms may bear independently substituents, such as $C_1$ to $C_{20}$-hydrocarbyl, tri($C_1$ to $C_{20}$-alkyl)silyl, tri($C_1$ to $C_{20}$-alkyl)siloxy and more preferably "R" is a one atom bridge like e.g. —SiR'''$_2$—, wherein each R''' is independently $C_1$ to $C_{20}$-alkyl, $C_2$ to $C_{20}$-alkenyl, $C_2$ to $C_{20}$-alkynyl, $C_3$ to $C_{12}$ cycloalkyl, $C_6$ to $C_{20}$-aryl, alkylaryl or arylalkyl, or tri($C_1$ to $C_{20}$ alkyl)silyl-residue, such as trimethylsilyl-, or the two R''' can be part of a ring system including the Si bridging atom.

In a preferred embodiment the transition metal compound has the formula (II)

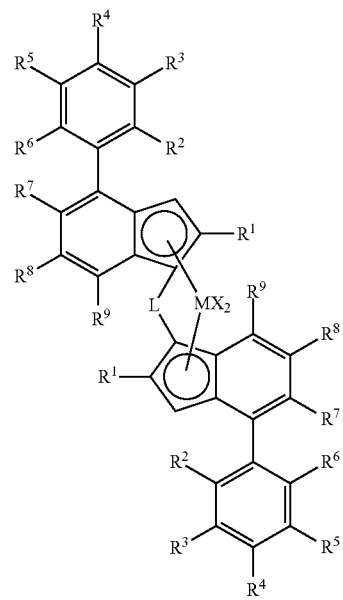

wherein

M is zirconium (Zr) or hafnium (Hf), preferably zirconium (Zr),

X are ligands with a σ-bond to the metal "M", preferably those as defined above for formula (I),
preferably chlorine (Cl) or methyl (CH$_3$), the former especially preferred, $R^1$ are equal to or different from each other, preferably equal to, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), preferably are equal to or different from each other, preferably equal to, and are $C_1$ to $C_{10}$ linear or branched hydrocarbyl, more preferably are equal to or different from each other, preferably equal to, and are $C_1$ to $C_6$ linear or branched alkyl, $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), preferably are equal to or different from each other and are $C_1$ to $C_{10}$ linear or branched hydrocarbyl, more preferably are equal to or different from each other and are $C_1$ to $C_6$ linear or branched alkyl, $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{11}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), and/or $R^7$ and $R^8$ being optionally part of a $C_4$ to $C_{20}$ carbon ring system together with the indenyl carbons to which they are attached, preferably a $C_5$ ring, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR^{10}$, and $SR^{10}$, preferably $R^9$ are equal to or different from each other and are H or $CH_3$, wherein $R^{10}$ is defined as before, L is a bivalent group bridging the two indenyl ligands, preferably being a $C_2R^{11}_4$ unit or a $SiR^{11}_2$ or $GeR^{11}_2$, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC), preferably $Si(CH_3)_2$, $SiCH_3C_6H_{11}$, or $SiPh_2$, wherein $C_6H_{11}$ is cyclohexyl.

Preferably the transition metal compound of formula (II) is $C_2$-symmetric or pseudo-$C_2$-symmetric. Concerning the definition of symmetry it is referred to Resconi et al. Chemical Reviews, 2000, Vol. 100, No. 4 1263 and references herein cited.

Preferably the residues $R^1$ are equal to or different from each other, more preferably equal, and are selected from the group consisting of linear saturated $C_1$ to $C_{10}$ alkyl, linear unsaturated $C_1$ to $C_{10}$ alkyl, branched saturated $C_1$ to $C_{10}$ alkyl, branched unsaturated $C_1$ to $C_{10}$ alkyl and $C_7$ to $C_{12}$ arylalkyl. Even more preferably the residues $R^1$ are equal to or different from each other, more preferably equal, and are selected from the group consisting of linear saturated $C_1$ to $C_6$ alkyl, linear unsaturated $C_1$ to $C_6$ alkyl, branched saturated $C_1$ to $C_6$ alkyl, branched unsaturated $C_1$ to $C_6$ alkyl and $C_7$ to $C_{10}$ arylalkyl. Yet more preferably the residues $R^1$ are equal to or different from each other, more preferably equal, and are selected from the group consisting of linear or branched $C_1$ to $C_4$ hydrocarbyl, such as for example methyl or ethyl.

Preferably the residues $R^2$ to $R^6$ are equal to or different from each other and linear saturated $C_1$ to $C_4$ alkyl or branched saturated $C_1$ to $C_4$ alkyl. Even more preferably the residues $R^2$ to $R^6$ are equal to or different from each other, more preferably equal, and are selected from the group consisting of methyl, ethyl, iso-propyl and tert-butyl.

Preferably $R^7$ and $R^8$ are equal to or different from each other and are selected from hydrogen and methyl, or they are part of a 5-methylene ring including the two indenyl ring carbons to which they are attached. In another preferred embodiment, $R^7$ is selected from $OCH_3$ and $OC_2H_5$, and $R^8$ is tert-butyl.

In a preferred embodiment the transition metal compound is rac-methyl(cyclohexyl)silanediyl bis(2-methyl-4-(4-tert-butylphenyl)indenyl)zirconium dichloride.

In a second preferred embodiment, the transition metal compound is rac-dimethylsilanediyl bis(2-methyl-4-phenyl-1,5,6,7-tetrahydro-s-indacen-1-yl)zirconium dichloride.

In a third preferred embodiment, the transition metal compound is rac-dimethylsilanediyl bis(2-methyl-4-phenyl-5-methoxy-6-tert-butylindenyl)zirconium dichloride.

As a further requirement the solid catalyst system (SCS) according to this invention must comprise a cocatalyst (Co) comprising an element (E) of group 13 of the periodic table (IUPAC), for instance the cocatalyst (Co) comprises a compound of Al.

Examples of such cocatalyst (Co) are organo aluminium compounds, such as aluminoxane compounds.

Such compounds of Al, preferably aluminoxanes, can be used as the only compound in the cocatalyst (Co) or together with other cocatalyst compound(s). Thus besides or in addition to the compounds of Al, i.e. the aluminoxanes, other cation complex forming cocatalyst compounds, like boron compounds can be used. Said cocatalysts are commercially available or can be prepared according to the prior art literature. Preferably however in the manufacture of the solid catalyst system only compounds of Al as cocatalyst (Co) are employed.

In particular preferred cocatalysts (Co) are the aluminoxanes, in particular the C1 to C10-alkylaluminoxanes, most particularly methylaluminoxane (MAO).

Preferably, the organo-zirconium compound of formula (I) and the cocatalyst (Co) of the solid catalyst system (SCS) represent at least 70 wt %, more preferably at least 80 wt %, even more preferably at least 90 wt %, even further preferably at least 95 wt % of the solid catalyst system. Thus it is appreciated that the solid catalyst system is featured by the fact that it is self-supported, i.e. it does not comprise any catalytically inert support material, like for instance silica, alumina or $MgCl_2$ or porous polymeric material, which is otherwise commonly used in heterogeneous catalyst systems, i.e. the catalyst is not supported on external support or carrier material. As a consequence of that the solid catalyst system (SCS) is self-supported and it has a rather low surface area.

In one embodiment the solid metallocene catalyst system (SCS) is obtained by the emulsion solidification technology, the basic principles of which are described in WO 03/051934. This document is herewith included in its entirety by reference.

Hence the solid catalyst system (SCS) is preferably in the form of solid catalyst particles, obtainable by a process comprising the steps of a) preparing a solution of one or more catalyst components;
b) dispersing said solution in a second solvent to form an emulsion in which said one or more catalyst components are present in the droplets of the dispersed phase,
c) solidifying said dispersed phase to convert said droplets to solid particles and optionally recovering said particles to obtain said catalyst.

Preferably a first solvent, more preferably a first organic solvent, is used to form said solution. Still more preferably the organic solvent is selected from the group consisting of a linear alkane, cyclic alkane, aromatic hydrocarbon and halogen-containing hydrocarbon.

Moreover the second solvent forming the continuous phase is an inert solvent towards to catalyst components, The second solvent might be immiscible towards the solution of the catalyst components at least under the conditions (like temperature) during the dispersing step. The term "immiscible with the catalyst solution" means that the second solvent (continuous phase) is fully immiscible or partly immiscible i.e. not fully miscible with the dispersed phase solution.

Preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro(methylcyclohexane) or perfluoro(1,3-dimethylcyclohexane) or a mixture thereof.

Furthermore it is preferred that the emulsion comprising said continuous phase and said dispersed phase is a bi- or multiphasic system as known in the art. An emulsifier may be used for forming and stabilising the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated C1-n (suitably C4-30- or C5-15) alcohol (e.g. highly fluorinated heptanol, octanol or nonanol), oxide (e.g. propenoxide) or acrylate ester which reacts e.g. with a cocatalyst component, such as aluminoxane to form the "actual" surfactant.

In principle any solidification method can be used for forming the solid particles from the dispersed droplets. According to one preferable embodiment the solidification is effected by a temperature change treatment. Hence the emulsion subjected to gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

For further details, embodiments and examples of the continuous and dispersed phase system, emulsion formation method, emulsifying agent and solidification methods reference is made e.g. to the above cited international patent application WO 03/051934.

All or part of the preparation steps can be done in a continuous manner. Reference is made to WO 2006/069733 describing principles of such a continuous or semicontinuous preparation methods of the solid catalyst types, prepared via emulsion/solidification method.

The above described catalyst components are prepared according to the methods described in WO 01/48034.

More over the present invention is related to the manufacture of the extrusion coated substrates by conventional extrusion coating of the propylene copolymer composition (P) as defined herein.

The film according to this invention can be obtained in a conventional manner for instance by cast film technology or extrusion blown film technology. In case the film shall be stretched, i.e. a biaxially oriented polypropylene film, it is produced preferably as follows: first, a cast film is prepared by extrusion of propylene copolymer composition (P) in the form of pellets. The prepared cast films may typically have a thickness of 50 to 100 μm as used for further film stretching. Subsequently, a stack of cast films can be prepared from a number of cast film sheets to achieve a specific stack thickness, e.g. 700 to 1000 μm. The stretching temperature is typically set to a temperature slightly below the melting point, e.g. 2 to 4° C. below the melting point, and the film is stretched at a specific draw ratio in machine direction and transverse direction.

The extrusion coating process may be carried out using conventional extrusion coating techniques. Hence, the propylene copolymer composition (P) obtained from the above defined polymerization process is fed, typically in the form of pellets, optionally containing additives, to an extruding device. From the extruder the polymer melt is passed preferably through a flat die to the substrate to be coated. Due to the distance between the die lip and the nip, the molten plastic is oxidized in the air for a short period, usually leading to an improved adhesion between the coating and the substrate. The coated substrate is cooled on a chill roll, after which it is passed to edge trimmers and wound up. The width of the line may vary between, for example, 500 to 1500 mm, e.g. 800 to 1100 mm, with a line speed of up to 1000 m/min, for instance 300 to 800 m/min. The temperature of the polymer melt is typically between 275 and 330° C. The propylene copolymer composition (P) of the invention can be extruded onto the substrate as a monolayer coating or as one layer in coextrusion. In either of these cases it is possible to use the propylene copolymer composition (P) as such or to blend the propylene copolymer composition (P) with other polymers. Blending can occur in a post reactor treatment or just prior to the extrusion in the coating process. However it is preferred that only the propylene copolymer composition (P) as defined in the present invention is extrusion coated. In a multilayer extrusion coating, the other layers may comprise any polymer resin having the desired properties and processability. Examples of such polymers include: barrier layer PA (polyamide) and EVA; polar copolymers of ethylene, such as copolymers of ethylene and vinyl alcohol or copolymers of ethylene and an acrylate monomer; adhesive layers, e.g. ionomers, copolymers of ethylene and ethyl acrylate, etc; HDPE for stiffness; LDPE resins produced in a high-pressure process; LLDPE resins produced by polymerising ethylene and alpha-olefin comonomers in the presence of a Ziegler, chromium or metallocene catalyst; and MDPE resins.

Thus the present invention is preferably related to extrusion coated substrates comprising a substrate and at least one layer of the propylene copolymer composition (P) extrusion coated on said substrate as defined in this invention.

Furthermore the present invention is also directed to the use of the inventive article as packing material, in particular as a packing material for food and/or medical products.

In the following, the present invention is described by way of examples.

EXAMPLES

A. Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. Standard single-pulse excitation was employed utilising the NOE at short recycle delays (as described in Pollard, M., Klimke, K., Graf, R., Spiess, H. W., Wilhelm, M., Sperber, O., Piel, C., Kaminsky, W., Macromolecules 2004, 37, 813, and in Klimke, K., Parkinson, M., Piel, C., Kaminsky, W., Spiess, H. W., Wilhelm, M., Macromol. Chem. Phys. 2006, 207, 382) and the RS-HEPT decoupling scheme (as described in Filip, X., Tripon, C., Filip, C., J. Mag. Resn. 2005, 176, 239, and in Griffin, J. M., Tripon, C., Samoson, A., Filip, C., and Brown, S. P., Mag. Res. in Chem. 2007, 45, S1, S198). A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

The tacticity distribution was quantified through integration of the methyl region in the $^{13}C\{^1H\}$ spectra, correcting for any signal not related to the primary (1,2) inserted propene stereo sequences, as described in Busico, V., Cipullo, R., Prog. Polym. Sci. 2001, 26, 443 and in Busico, V., Cipullo, R., Monaco, G., Vacatello, M., Segre, A. L., Macromolecules 1997, 30, 6251.

Characteristic signals corresponding to regio defects were observed (Resconi, L., Cavallo, L., Fait, A., Piemontesi, F., Chem. Rev. 2000, 100, 1253). The influence of regio defects on the quantification of the tacticity distribution was corrected for by subtraction of representative regio defect integrals from specific integrals of the stereo sequences.

The isotacticity was determined at the triad level and reported as the percentage of isotactic triad mm with respect to all triad sequences:

$$\% \, mm = (mm/(mm+mr+rr))*100$$

Characteristic signals corresponding to the incorporation of 1-hexene were observed, and the 1-hexene content was calculated as the mole percent of 1-hexene in the polymer, H(mol %), according to:

$$[H] = H_{tot}/(P_{tot}+H_{tot})$$

where:

$$H_{tot} = I(\alpha B_4)/2 + I(\alpha\alpha B_4) \times 2$$

where $I(\alpha B_4)$ is the integral of the $\alpha B_4$ sites at 44.1 ppm, which identifies the isolated 1-hexene incorporated in PPHPP sequences, and $I(\alpha\alpha B_4)$ is the integral of the $\alpha\alpha B_4$ sites at 41.6 ppm, which identifies the consecutively incorporated 1-hexene in PPHHPP sequences. $P_{tot}$=Integral of all CH3 areas on the methyl region with correction applied for underestimation of other propene units not accounted for in this region and overestimation due to other sites found in this region.

and $H(mol \%) = 100 \times [H]$ which is then converted into wt % using the correlation $$H(wt \%) = (100 \times Hmol \% \times 84.16)/(Hmol \% \times 84.16 + (100-Hmol \%) \times 42.08)$$

A statistical distribution is suggested from the relationship between the content of hexene present in isolated (PPHPP) and consecutive (PPHHPP) incorporated comonomer sequences: $[HH] < [H]^2$ Calculation of comonomer content of the propylene copolymer (B):

$$\frac{C(CPP) - w(A) \times C(A)}{w(B)} = C(B)$$

wherein w(A) is the weight fraction of the propylene copolymer (A), w(B) is the weight fraction of the propylene copolymer (B), C(A) is the comonomer content [in wt.-%] measured by $^{13}C$ NMR spectroscopy of the propylene copolymer (A), i.e. of the product of the first reactor (R1), C(CPP) is the comonomer content [in wt.-%] measured by $^{13}C$ NMR spectroscopy of the product obtained in the second reactor (R2), i.e. the mixture of the propylene copolymer (A) and the propylene copolymer (B) [of the propylene copolymer composition (P)], C(B) is the calculated comonomer content [in wt.-%] of the propylene copolymer (B)

Mw, Mn, MWD

Mw/Mn/MWD are measured by Gel Permeation Chromatography (GPC) according to the following method:

The weight average molecular weight (Mw), the number average molecular weight (Mn), and the molecular weight distribution (MWD=Mw/Mn) is measured by a method based on ISO 16014-1:2003 and ISO 16014-4:2003. A Waters Alliance GPCV 2000 instrument, equipped with refractive index detector and online viscosimeter is used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution are injected per analysis. The column set is calibrated using relative calibration with 19 narrow MWD polystyrene (PS) standards in the range of 0.5 kg/mol to 11 500 kg/mol and a set of well characterized broad polypropylene standards. All samples are prepared by dissolving 5 to 10 mg of polymer in 10 mL (at 160° C.) of stabilized TCB (same as mobile phase) and keeping for 3 hours with continuous shaking prior sampling in into the GPC instrument.

Melt Flow Rate (MFR)

The melt flow rates are measured with a load of 2.16 kg (MFR$_2$) at 230° C. The melt flow rate is that quantity of polymer in grams which the test apparatus standardised to ISO 1133 extrudes within 10 minutes at a temperature of 230° C. under a load of 2.16 kg. Calculation of melt flow rate MFR$_2$ (230° C.) of the propylene copolymer (B):

$$MFR(B) = 10^{\left[\frac{\log(MFR(P)) - w(A) \times \log(MFR(A))}{w(B)}\right]}$$

wherein
w(A) is the weight fraction of the polypropylene (A),
w(B) is the weight fraction of the propylene copolymer (B),
MFR(A) is the melt flow rate MFR$_2$ (230° C.) [in g/10 min] measured according ISO 1133 of the polypropylene (A),
MFR(P) is the melt flow rate MFR$_2$ (230° C.) [in g/10 min] measured according ISO 1133 of the propylene copolymer composition (P),
MFR(B) is the calculated melt flow rate MFR$_2$ (230° C.) [in g/10 min] of the propylene copolymer (B).

Xylene Cold Soluble Fraction (XCS Wt %)

The xylene cold soluble fraction (XCS) is determined at 23° C. according to ISO 6427.

Hexane Solubles

FDA section 177.1520

1 g of a polymer film of 100 μm thickness is added to 400 ml hexane at 50° C. for 2 hours while stirring with a reflux cooler.

After 2 hours the mixture is immediately filtered on a filter paper N°41.

The precipitate is collected in an aluminium recipient and the residual hexane is evaporated on a steam bath under N$_2$ flow.

The amount of hexane solubles is determined by the formula ((wt. sample+wt. crucible)−(wt crucible))/(wt. sample)·100.

Melting temperature T$_m$, crystallization temperature T$_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Porosity:

BET with N$_2$ gas, ASTM 4641, apparatus Micromeritics Tristar 3000;
sample preparation: at a temperature of 50° C., 6 hours in vacuum.

Surface Area:

BET with N$_2$ gas ASTM D 3663, apparatus Micromeritics Tristar 3000: sample preparation at a temperature of 50° C., 6 hours in vacuum.

Tensile Modulus:

Tensile moduli in machine and transverse direction were determined acc. to ISO 527-3 on films with a thickness of 100 m at a cross head speed of 1 mm/min. Subsequently, elongation at break in machine and transverse direction were determined acc. to ISO 527-3 on the same specimens using a cross head speed of 50 mm/min. Test speed was changed after a deformation of 0.25%. Specimen type 2 acc. ISO 527-3 in the form of stripes with a width of 15 mm and length of 200 mm was used.

Sealing Initiation Temperature (SIT); Sealing End Temperature (SET), Sealing Range:

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device.

The sealing range is determined on a J&B Universal Sealing Machine Type 3000 with a film of 100 μm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. | specimen is sealed A to A at each sealbar temperature and seal strength (force) is determined at each step.

The temperature is determined at which the seal strength reaches 3 N.

Hot Tack Force:

The hot tack force is determined on a J&B Hot Tack Tester with a film of 100 μm thickness with the following further parameters:

| | |
|---|---|
| Specimen width: | 25.4 mm |
| Seal Pressure: | 0.3 N/mm$^2$ |
| Seal Time: | 0.5 sec |
| Cool time: | 99 sec |
| Peel Speed: | 200 mm/sec |
| Start temperature: | 90° C. |
| End temperature: | 140° C. |
| Increments: | 10° C. |

The maximum hot tack force, i.e the maximum of a force/temperature diagram is determined and reported.

B. Examples

The polymers of table 1 have been produced in a Borstar PP pilot plant in a two-step polymerization process starting in a bulk-phase loop reactor followed by polymerization in a gas phase reactor, varying the molecular weight as well as ethylene and hexene content by appropriate hydrogen and comonomer feeds. The catalyst used in the polymerization process was a metallocene catalyst as described in example 1 of EP 1 741 725 A1.

TABLE 1

Preparation of the examples

| | | CE 1 | CE 2 | IE 1 | IE 2 | IE 3 | IE 4 |
|---|---|---|---|---|---|---|---|
| Loop | | | | | | | |
| MFR$_2$ | [g/10 min] | 6.0 | 0.9 | 7.9 | 7.4 | 10.3 | 9.5 |
| Mw | [kg/mol] | 460 | 820 | 365 | 380 | 265 | 322 |
| C6 | [wt.-%] | 0.0 | 0.0 | 3.5 | 1.3 | 2.2 | 2.9 |
| C2 | [wt.-%] | 2.4 | 0.0 | 0.0 | 0.0 | 0.0 | 0.0 |
| XCS | [wt.-%] | 1.8 | 0.7 | 0.8 | 1.4 | 1.1 | 0.7 |
| GPR | | | | | | | |
| MFR$_2$ | [g/10 min] | 5.8 | 67.4 | 6.8 | 4.8 | 5.5 | 5.7 |
| C6 | [wt.-%] | 0.0 | 5.2 | 13.0 | 4.1 | 6.9 | 9.3 |
| C2 | [wt.-%] | 3.8 | 0.0 | 0.0 | 0.0 | 0.0 | 0.0 |
| XCS | [wt.-%] | 6.2 | 1.4 | 14.6 | 1.2 | 1.5 | 9.5 |
| Split Loop/GPR | [%] | 59/41 | 42/58 | 74/26 | 59/41 | 64/36 | 69/31 |

TABLE 1-continued

Preparation of the examples

|  |  | CE 1 | CE 2 | IE 1 | IE 2 | IE 3 | IE 4 |
|---|---|---|---|---|---|---|---|
| FINAL |  |  |  |  |  |  |  |
| C6 | [wt.-%] | 0.0 | 3.0 | 6.0 | 2.4 | 3.9 | 4.9 |
| C2 | [wt.-%] | 3.0 | 0.0 | 0.0 | 0.0 | 0.0 | 0.0 |
| XCS | [wt.-%] | 3.7 | 1.1 | 14.6 | 1.3 | 1.3 | 3.4 |
| Hexane | [wt.-%] | 1.5 | 1.5 | 1.3 | 0.9 | 0.8 | 1.0 |
| MFR$_2$ | [g/10 min] | 5.9 | 11.0 | 7.6 | 6.2 | 8.1 | 8.1 |
| Mw | [kg/mol] | — | — | 208 | 192 | 206 | 183 |
| MWD | [—] | 3.0 | — | 2.9 | 2.8 | 3.0 | 2.7 |
| Tm | [° C.] | 135 | 147 | 128 | 138 | 134 | 131 |
| Tc | [° C.] | 99 | 106 | 93 | 104 | 98 | 97 |

Loop defines the polypropylene (A)
GPR defines the propylene copolymer (B)
Final defines the propylene copolymer composition (P)
C6 is 1-hexene content
C2 is the ethylene content

TABLE 2

Properties of the examples

|  |  | CE 1 | CE 2 | IE 1 | IE 2 | IE 3 | IE 4 |
|---|---|---|---|---|---|---|---|
| FINAL |  |  |  |  |  |  |  |
| TM (MD) | [MPa] | 482 | 589 | 413 | 606 | 527 | 485 |
| TM (TD) | [MPa] | 497 | 582 | 418 | 617 | 525 | 483 |
| SIT | [° C.] | 112 | 112 | 96 | 116 | 110 | 104 |
| SET | [° C.] | 120 | 126 | 118 | 128 | 122 | 120 |
| SET − SIT | [° C.] | 8 | 14 | 22 | 12 | 12 | 16 |
| ST | [° C.] | 105 | 120 | 85 | 98 | 90 | 85 |
| HTF | [N] | 1.4 | 3.2 | 3.6 | 2.6 | 3.3 | 3.4 |
| TPE | [J/mm] | 16.0 | 8.3 | 16.3 | 17 | 14.7 | 16.6 |

TM (MD) is the tensile modulus in machine direction
TM (TD) is the tensile modulus in transversal direction
SIT is the heat sealing initiation temperature
SET is the heat sealing end temperature
SET − SIT is the difference of SET and SIT
ST is the sealing temperature
HTF is the hot tack force
TPE is the total penetration energy

The invention claimed is:

1. Propylene copolymer composition (P) comprising:
   (a) a propylene copolymer (A) having a comonomer content of at least 1.0 wt %, the comonomers are $C_5$ to $C_{12}$ α-olefins, and
   (b) a propylene copolymer (B) having a comonomer content of 3.5 to 6.5 wt %, the comonomers are $C_5$ to $C_{12}$ α-olefins,
   wherein further:
   (i) the comonomer content in the propylene copolymer (A) is lower compared to the comonomer content in the propylene copolymer (B),
   (ii) the propylene copolymer composition (P) has a comonomer content of 2.0 to 10.0 wt. %, the comonomers are $C_5$ to $C_{12}$ α-olefins,
   (iii) the weight ratio of the propylene copolymer (A) to the propylene copolymer (B) is in the range of 20/80 to 80/20, and
   (iv) the propylene copolymer composition (P) has crystallization temperature (Tc) measured according to ISO 11357-3 in the range of 88 to 110° C.

2. Propylene copolymer composition (P) according to claim 1, wherein com (P)/com (A) is in the range of 1.0 to 10.0 wherein
   com (A) is the comonomer content of the propylene copolymer (A) given in weight percent [wt. %]
   com (P) is the comonomer content of the propylene copolymer composition (P) given in weight percent [wt. %].

3. Propylene copolymer composition (P) according to claim 1, wherein the propylene copolymer composition (P) fulfills the equation (I)

$$Tm-SIT \geq 22° C. \qquad (I)$$

wherein
   Tm is the melting temperature given in centigrade [° C.] of the propylene copolymer (P)
   SIT is the heat sealing initiation temperature (SIT) given in centigrade [° C.] of the propylene copolymer (P).

4. Propylene copolymer composition (P) according to claim 1, wherein the propylene copolymer composition (P) has a heat sealing initiation temperature (SIT) of not more than 120° C.

5. Propylene copolymer composition (P) according to claim 1, wherein the propylene copolymer composition (P) has
   (a) a melt flow rate MFR$_2$ (230° C.) measured according to ISO 1133 in the range of 2.0 to 50.0 g/10 min, and/or;
   (b) a melting temperature Tm of at least 125° C., and/or
   (c) a xylene soluble content (XCS) determined at 23° C. according to ISO 6427 of below 20.0 wt. %.

6. Propylene copolymer composition (P) according to claim 1, wherein the comonomers are selected from the group of $C_5$ α-olefin, $C_6$ α-olefin, $C_7$ α-olefin, $C_8$ α-olefin, $C_9$ α-olefin, $C_{10}$ α-olefin, $C_{11}$ α-olefin and $C_{12}$ α-olefin.

7. Propylene copolymer composition (P) according to claim 1, wherein the propylene copolymer composition (P) has a molecular weight distribution (MWD) measured by gel permeation chromatography (GPC) of not more than 4.0.

8. Propylene copolymer composition (P) according to claim 1, wherein the ratio MFR (A)/MFR (P) is in the range of 0.25 to 10.0 wherein;
   MFR (A) is the melt flow rate MFR$_2$ (230° C.) [g/10 min] measured according to ISO 1133 of the propylene copolymer (A),
   MFR (P) is the melt flow rate MFR$_2$ (230° C.) [g/10 min] measured according to ISO 1133 of the propylene copolymer composition (P).

9. Propylene copolymer composition (P) according to claim 1, wherein the propylene copolymer (A) has;
   (a) a comonomer content in the range of 1.0 to 4.0 wt. %, and/or;
   (b) a melt flow rate MFR$_2$ (230° C.) measured according to ISO 1133 of at least 0.5 g/10 min, and/or;
   (c) a xylene soluble content (XCS) of below 2.0 wt. %.

10. Propylene copolymer composition (P) according to claim 1, wherein the propylene copolymer (A) and/or propylene copolymer (B) comprise 1-hexene as comonomer.

11. Film, comprising a propylene copolymer composition (P) according to claim 1.

12. Extrusion coated substrate comprising a coating, said coating comprising a propylene copolymer composition (P) according to claim 1.

13. Process for the preparation of a propylene copolymer composition (P) according to claim 1, wherein the process is a sequential polymerization process comprising at least two reactors connected in series, wherein said process comprises the steps of:
   (A) polymerizing in a first reactor (R-1) being a slurry reactor (SR) propylene and at least one $C_5$ to $C_{12}$ α-olefin obtaining a propylene copolymer (A),
   (B) transferring said propylene copolymer (A) and unreacted comonomers of the first reactor in a second reactor (R-2) being a gas phase reactor (GPR-1), (C) feeding to said second reactor (R-2) propylene and at least one $C_4$ to $C_{10}$ α-olefin, (D) polymerizing in said second reactor (R-2) and in the presence of said first propylene copolymer (A) propylene and at least one $C_5$ to $C_{12}$ α-olefin obtaining a propylene copolymer (B), said propylene copolymer (A) and said propylene copolymer (B) form the propylene copolymer composition (P), wherein further in the first reactor (R-1) and second reactor (R-2) the polymerization takes place in the presence of a solid catalyst system (SCS), said solid catalyst system (SCS) comprises (i) a transition metal compound of formula (I):

$$R_n(Cp')_2MX_2 \quad (I)$$

Wherein "M" is zirconium (Zr) or hafnium (Hf), each "X" each "Cp" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M), "R" is a bivalent bridging group linking said organic ligands (Cp'), "n" is 1 or 2, and (ii) optionally a cocatalyst (Co) comprising an element (E) of group 13 of the periodic table (IUPAC).

14. Process according to claim 13, wherein the transition metal compound of formula (I) is an organo-zirconium compound of formula (II):

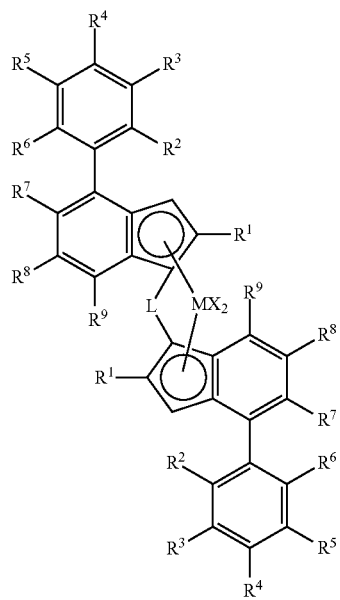

wherein M is zirconium (Zr) or hafnium (Hf),

X are ligands with a σ-bond to the metal "M", $R^1$ are equal to or different from each other, and are selected from the group consisting of linear saturated $C_1$ to $C_{20}$ alkyl, linear unsaturated $C_1$ to $C_{20}$ alkyl, branched saturated $C_1$-$C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Table (IUPAC), $R^2$ to $R^6$ are equal to or different from each other and are selected from the group consisting of hydrogen, linear saturated $C_1$-$C_{20}$ alkyl, linear unsaturated $C_1$-$C_{20}$ alkyl, branched saturated $C_1$-$C_{20}$ alkyl, branched unsaturated $C_1$-$C_{20}$ alkyl, $C_3$-$C_{20}$ cycloalkyl, $C_6$-$C_{20}$ aryl, $C_7$-$C_{20}$ alkylaryl, and $C_7$-$C_{20}$ arylalkyl, optionally containing one or more heteroatoms of groups 14 to 16 of the Periodic Table (IUPAC), $R^7$ and $R^8$ are equal to or different from each other and selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, optionally containing one or more heteroatoms of groups 14 to 16 of the Periodic Table (IUPAC), $SiR^{10}_3$, $GeR^{10}_3$, $OR^{10}$, $SR^{10}$ and $NR^{10}_2$, wherein $R^{10}$ is selected from the group consisting of linear saturated $C_1$-$C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, and $C_7$ to $C_{20}$ arylalkyl, optionally containing one or more heteroatoms of groups 14 to 16 of the Periodic Periodic Table (IUPAC), and/or $R^7$ and $R^8$ being optionally part of a $C_4$ to $C_{20}$ carbon ring system together with the indenyl carbons to which they are attached, optionally one carbon atom can be substituted by a nitrogen, sulfur or oxygen atom, $R^9$ are equal to or different from each other and are selected from the group consisting of hydrogen, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl, $C_7$ to $C_{20}$ arylalkyl, $OR_{10}$, and $SR_{10}$, wherein $R^{10}$ is defined as before, L is a bivalent group bridging the two indenyl ligands, wherein, $R^{11}$ is selected from the group consisting of H, linear saturated $C_1$ to $C_{20}$ alkyl, linear unsaturated $C_1$ to $C_{20}$ alkyl, branched saturated $C_1$ to $C_{20}$ alkyl, branched unsaturated $C_1$ to $C_{20}$ alkyl, $C_3$ to $C_{20}$ cycloalkyl, $C_6$ to $C_{20}$ aryl, $C_7$ to $C_{20}$ alkylaryl or $C_7$ to $C_{20}$ arylalkyl, optionally containing one or more heteroatoms of groups 14 to 16 of the Periodic Table (IUPAC).

15. Propylene copolymer composition (P) according to claim 1, wherein the propylene copolymer composition (P) has been obtained by a process comprising the following steps:

(A) polymerizing in a first reactor (R-1) being a slurry reactor (SR) propylene and at least one $C_5$ to $C_{12}$ α-olefin obtaining a propylene copolymer (A), (B) transferring said propylene copolymer (A) and unreacted comonomers of the first reactor in a second reactor (R-2) being a gas phase reactor (GPR-1), (C) feeding to said second reactor (R-2) propylene and at least one $C_4$ to $C_{10}$ α-olefin, (D) polymerizing in said second reactor (R-2) and in the presence of said first propylene copolymer (A) propylene and at least one $C_5$ to $C_{12}$ α-olefin obtaining a propylene copolymer (B), said propylene copolymer (A) and said propylene copolymer (B) form the propylene copolymer composition (P), wherein further in the first reactor (R-1) and second reactor (R-2) the polymerization takes place in the presence of a solid catalyst system (SCS), said solid catalyst system (SCS) comprises (i) a transition metal compound of formula (I):

$R_n(Cp')_2MX_2$         (I)

Wherein "M" is zirconium (Zr) or hafnium (Hf),
each "X" each "Cp" is a cyclopentadienyl-type organic ligand independently selected from the group consisting of substituted cyclopentadienyl, substituted indenyl, substituted tetrahydroindenyl, and substituted or unsubstituted fluorenyl, said organic ligands coordinate to the transition metal (M),
"R" is a bivalent bridging group linking said organic ligands (Cp'),
"n" is 1 or 2 and
(ii) optionally a cocatalyst (Co) comprising an element (E) of group 13 of the periodic table (IUPAC).

* * * * *